(12) United States Patent
Ramakrishnan et al.

(10) Patent No.: US 9,043,500 B2
(45) Date of Patent: May 26, 2015

(54) SYSTEM AND METHOD FOR GENERATING A VIRTUAL PCI-TYPE CONFIGURATION SPACE FOR A DEVICE

(71) Applicant: INTEL CORPORATION, Santa Clara, CA (US)

(72) Inventors: Siva Ramakrishnan, Beaverton, OR (US); Kristine Karnos, San Jose, CA (US); Siddhartha Nath, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/728,830

(22) Filed: Dec. 27, 2012

(65) Prior Publication Data

US 2014/0006650 A1 Jan. 2, 2014

(30) Foreign Application Priority Data

Jun. 30, 2012 (IN) .......................... 02056/DEL/2012

(51) Int. Cl.
*G06F 3/00* (2006.01)
*G06F 9/44* (2006.01)
*G06F 1/20* (2006.01)

(52) U.S. Cl.
CPC .............. *G06F 9/4411* (2013.01); *G06F 1/20* (2013.01); *G06F 1/203* (2013.01)

(58) Field of Classification Search
None
See application file for complete search history.

(56) References Cited

U.S. PATENT DOCUMENTS

2007/0180154 A1* 8/2007 Cornwell et al. .................. 710/5
2014/0019652 A1* 1/2014 Soffer ............................. 710/73

* cited by examiner

*Primary Examiner* — Idriss N Alrobaye
*Assistant Examiner* — David Martinez
(74) *Attorney, Agent, or Firm* — KED & Associates LLP

(57) ABSTRACT

An electronic data tablet has a controller and transition manager. The controller is to store in a memory of the tablet virtual configuration space information for a peripheral device of a computer, and the transition manager is to control the controller to operate in a first mode and a second mode. The virtual configuration space information is stored in the tablet memory when the first mode is to be switched to the second mode. When the second mode is switched to the first mode, the virtual configuration space information is accessed to control recognition of the peripheral device of the computer without performing a re-scanning operation.

18 Claims, 7 Drawing Sheets

SYSTEM AND METHOD FOR GENERATING A VIRTUAL PCI-TYPE CONFIGURATION SPACE FOR A DEVICE

CROSS-REFERENCE TO RELATED APPLICATION

This application claims priority to Indian Application No. 02056/DEL/2012 filed on Jun. 30, 2012, whose entire disclosure is hereby incorporated by reference.

FIELD

One or more embodiments described herein relate to controlling communications between electronic devices.

BACKGROUND

The introduction of data tablets has met consumer demand for a variety of applications. One type of tablet provides multi-functionality in a single device by providing a screen that moves between tablet and standard computer (PC) screen positions. Another type of tablet connects to a computer through an external port. These tablets have drawbacks, not the least of which relate to delays that occur in switching between tablet and computer modes. These modes have different processing, bus and addressing schemes which have necessitated the performance of management operations that slow performance and reduce user convenience.

DETAILED DESCRIPTION

Figure 1:
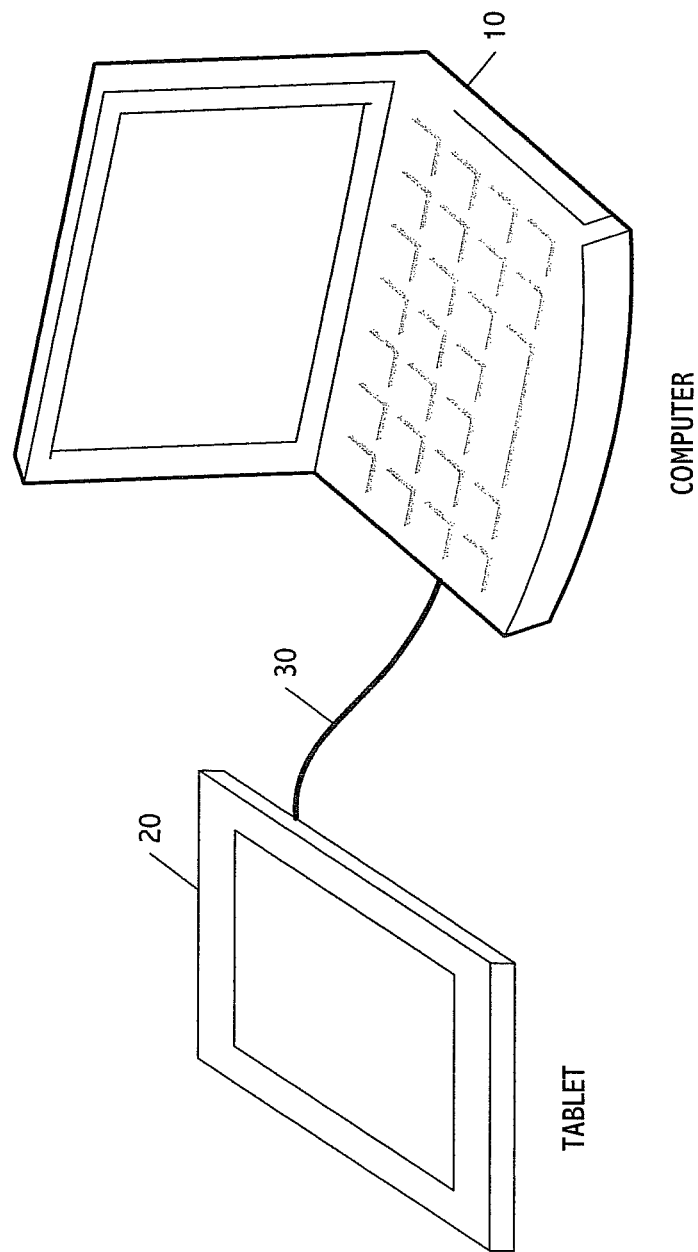
FIG. 1 is a diagram showing one type of information system with a tablet.

FIG. 1 shows one type of information system that includes a computer 10 capable of being removably connected to an electronic data tablet 20. The computer may be a notebook, laptop or desktop computer or may be any one of a number of mobile devices or even another tablet. The tablet may be a pad-type device, a detachable computer tablet, or even a smart phone or other device equipped with wireless mobile communication capability.

The devices may be connected by an interface 30 which, for example, may be a Universal Serial Bus (USB) or other physical interface. Alternatively, the computer and tablet may be connected through a wireless interface such as but not limited to a local interface standard such as Bluetooth or wireless fidelity (WiFi).

The ability to removably connect the tablet to the computer increases the scalable computing platform of the computer. This serves to enhance functionality to, for example, various gaming, graphics, and/or data management applications that might not otherwise be available for use on the computer itself. When the tablet is connected, the tablet may be considered to operate in tablet mode. When detached, the tablet may be considered to operate in computer mode. (In some applications, the ability to removably connect the tablet may make the computer a scalable device, which may allow the device to scale from a simple smartphone or tablet to fully capable computer).

The computer in FIG. 1 is shown to have its own screen. In an alternative embodiment, the computer may be a notebook computer with a single removable screen which serves as a tablet when removed and as the computer screen when attached. According to another arrangement, the screen of the computer may swivel or otherwise move into different positions. In a first position, the screen may have a standard location in computer mode. In another position, the computer may move to an overlapping position over the keyboard to serve as a tablet. A switch or other circuit may be used to determine the position of the screen, to thereby control operation of the computer in the computer and tablet modes.

In these embodiments, the tablet may be communicate with the computer based on a suitable protocol such as, for example, a direct media interface (DMI) standard, one of a plurality of peripheral component interconnect standards including but not limited to PCI, PCI extended (PCI-X) or PCI express (PCIe), or a combination thereof. Also, in the aforementioned embodiments, switching between computer and tablet modes may require a number of management functions to be performed. These functions may be performed relative to a peripheral component interconnect configuration space, which defines which devices are currently connected (wirelessly, port connections, or otherwise) to the computer. These devices and/or the computer itself may be referred to as PCIe devices.

More specifically, in addition to memory-mapped and input/output (I/O) port spaces, each device or device function connected as a peripheral to the computer may be considered to have a configuration space, as well as the computer itself. Each space may correspond to a predetermined number of bytes (e.g., 256 bytes) separately addressable. The address of the configuration space of each device may correspond to a bus address or a link-based point-to-point interconnection address.

In a typical scenario, the computer may have a plurality of connected peripheral (e.g., PCIe) devices. If and when devices are added or removed from the computer, the PCIe configuration space may change and have to be re-scanned or re-enumerated to make sure the most current information about the devices attached to the system is available. If the peripheral component interconnect configuration space is rescanned every time a mode change occurs (e.g., computer mode to tablet mode, or vice versa), delays may be introduced which may prove inconvenient to a user. These delays may only be increased if plug-and-play (PnP) initializations are also required to be performed for each mode change. The delays could be at least hundreds of milliseconds or more for each device causing the delay of the availability of the device to the user after a mode change.

Figure 2:
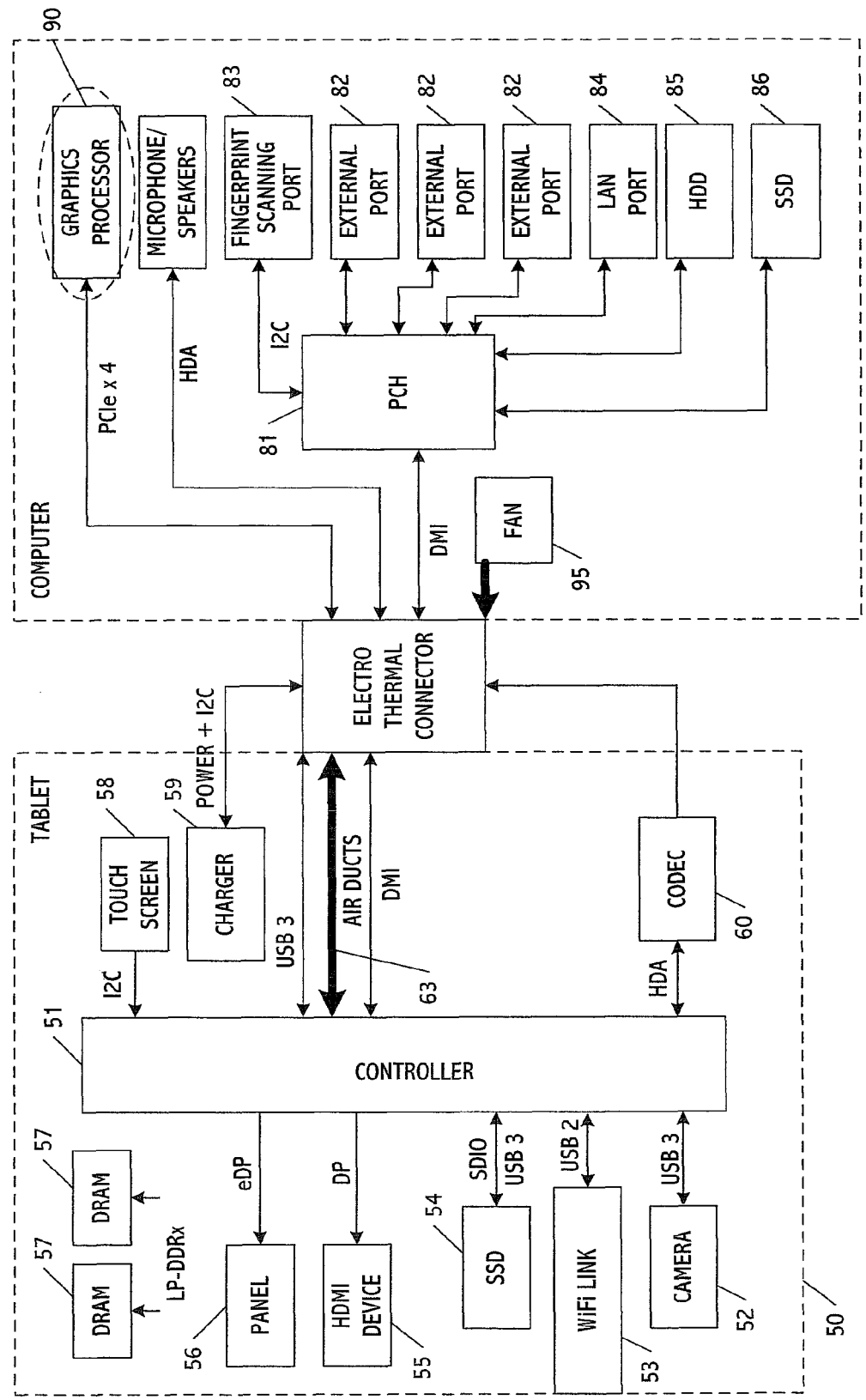
FIG. 2 is a diagram showing an example of a scalable computing platform that corresponds to the computer and tablet in FIG. 1.

FIG. 2 shows an example of a scalable computing platform which may correspond to the computer and tablet in FIG. 1.

As shown, tablet 50 is coupled to computer 80 through a connector 40, which, for example, may be an electro-thermal connector.

The tablet may include a controller 51 which includes or is coupled to a platform controller hub (PCH) for managing communications between one or more peripheral component interconnect (PCI)-type devices. These devices may include, for example, a camera 52, a WiFi link 53, a solid-state drive (SSD) 54, a high definition multimedia interface (HDMI)-connected device 55, and panel 56. These devices may be included in or coupled to the housing of the tablet. The tablet may also include one or more dynamic random access memories (DRAMs) 57, a touch screen 58, a charger 59, and an audio coder/decoder (Codec) 60 also included in or coupled to the tablet housing.

The PCI-type devices of the tablet are coupled to the controller through appropriate interfaces, which, for example, may include USB interfaces/ports, digital ports (DP), and an embedded display port (dDP). The DRAMs may be connected to the controller through a double data rate (DDR) link.

The connector 40 may include pins and/or signal lines including one or more USB lines for communicating data with the computer as well as at least one DMI signal line. The connector may also be connected to the charger to allow a battery of the tablet to be charged based on power from the computer. Also, audio signal lines may be included for coupling to the audio Codec.

The computer 80 includes a platform controller hub (PCH) 81 for managing communications with one or a plurality of PCI-type devices. These devices may be located in or coupled to the computer through corresponding ports. The ports include a plurality of external ports 82, a fingerprint scanning port 83, a local area network (LAN) port 84, an optical disk drive (ODD) 85, and a hard-disk drive (HDD) or SSD 86. The PCH 81 may be coupled to the tablet through the connector via a DMI line, and one or more PCI express (PCIe) signal lines may connect a graphics processor 90, which, for example, may operate as a graphics processor for information to be displayed on the tablet when the tablet is connected in computer mode.

The computer may also include a fan 95 for cooling the electrical components of the computer. The tablet may not have a fan. Therefore, when the computer is connected to the tablet, the fan of the computer may serve to cool the tablet and its components (which may be functioning at a higher performance level in the computer mode and hence may generate more heat from the components), for example, based on heat transfer through the electro-thermal connector 40 and one or more air ducts 63 included in the tablet.

The peripheral devices of the computer communicate with the computer controller and PCH through a PCI-type protocol. The computer peripherals may also communicate and exchange data with the tablet through this type of protocol. In accordance with one embodiment, the computer peripherals are PCIe devices that communicate with the computer controller and PCH based on a compatible PCIe protocol standard.

PCIe is an industry standard input/output segment architecture that may connect peripheral devices to the computer and tablet through, for example, a bi-directional link. While one embodiment may correspond to a PCI-bus arrangement, another embodiment using PCIe may be a link-based I/O which uses configuration transaction packets to manage communications between the computer and tablet.

For example, the tablet may view the computer and/or its peripheral devices as corresponding PCIe I/O segments containing one or more access points through which information including configuration transaction commands are transferred. These commands control functional aspects of the tablet, computer, and peripheral devices. These functional aspects include performing management functions for controlling the tablet and computer (and its peripherals) to change functionality when switching between tablet and computer modes. These commands also play a role in establishing a virtual configuration space for the computer and/or its peripherals. Such a virtual configuration space may improve efficiency and performance when switching between these modes.

By way of example, transactions executed in a link-based computing system are made based on addresses. Each type of transaction may be given a unique address which is executed on the component that initiates the transaction. In order to initiate the transaction, the address of the transaction is decoded into actions needed to perform the transaction. Examples of transactions include read and write transactions.

In the case of a configuration read transaction, an address that corresponds to this type of transaction is decoded for purposes of sending a command to the targeted I/O segment having content to be read. In the case of a configuration write transaction, an address that corresponds to this type of transaction is decoded for purposes of sending a command to the targeted I/O segment having content to be written. In accordance with at least one embodiment, additional configuration transactions correspond to addresses that are decoded for switching between computer and tablet modes and their attendant functions. Memory maps having different address ranges may be used for the configuration transaction addresses to be decoded.

Figure 3:
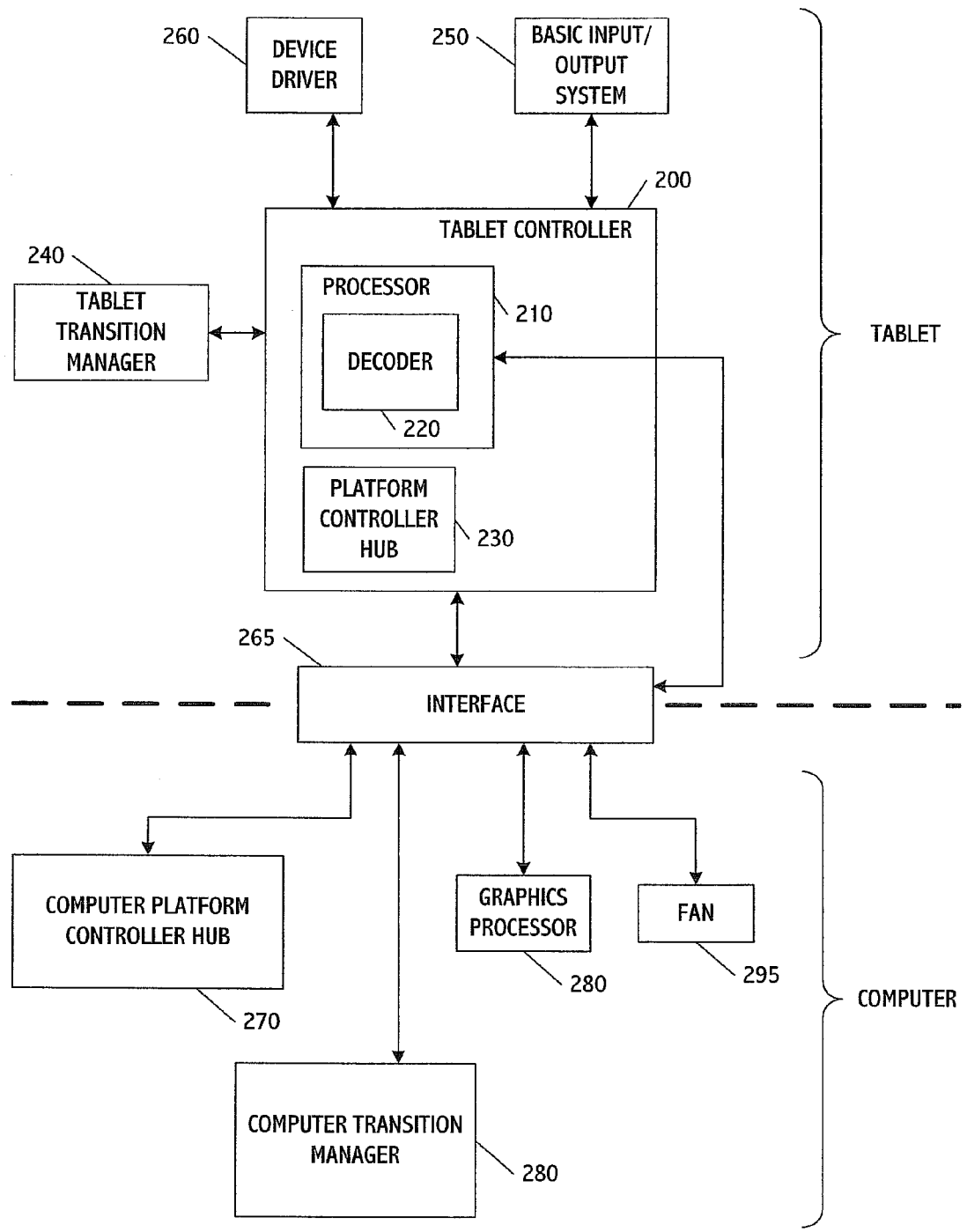
FIG. 3 is a diagram showing one embodiment of the information system.

FIG. 3 shows a functional block diagram of an information system that may correspond to any of the information systems previously described. In order to reduce delays when switching between computer and tablet modes, this system employs a management approach that does not re-scan the peripheral component interconnect space(s) of the computer when a mode change occurs.

Instead, information indicative of the PCIe configuration space of the computer is stored in a memory in the tablet based on a memory mapping performed by an address decoder. When the computer is disconnected from the tablet (i.e., when changing from computer mode to tablet mode), address-decoded information corresponding to the PCIe information is stored in a memory of the tablet. This stored information corresponds to virtual PCIe configuration space for the connected computer, which alleviates the need to perform a re-scanning procedure and plug-n-play (PnP) initialization operations to determine the configuration space for the computer when the computer is re-connected to the tablet. This improves the so-called attach speed of the tablet which inures to user convenience.

As shown in FIG. 3, the tablet is connected to the computer through an interface 265. The tablet has a housing, or chassis, that includes a controller, one or more memories, a display, communication components, and various board components including voltage regulators battery, and charger. The tablet operates in tablet mode when the tablet is detached from the computer and in computer mode when the tablet is connected to the computer. When detached, the configuration space of the computer and/or its peripherals is virtualized to be described in greater detail below.

The controller 200 is equipped with a processor 210 and a platform controller hub (PCH) 230. The controller may be a system-on-chip (SoC) or silicon-on-package (SOP) or may have a different arrangement. The processor may control overall operations of the tablet and includes an address decoder 220 for mapping configuration I/O addresses for storage into memory 255 of the tablet. If the address decoder has been activated, the decoder may map addresses to predetermined memory address ranges. According to one embodiment, the computer and/or its peripherals may be considered PCIe devices with corresponding root ports. The configuration space(s) for the computer and its devices may each be provided with a unique 4 KB space(s) in the memory of the tablet to allow for virtualization.

The processor may also include a machine state register (MSR) for controlling PCIe configuration space virtualization. This register may have one or more bits for turning on and off the virtualization. When turned on, PCIe configuration space information for the computer and/or its peripherals is stored in predetermined 4 KB ranges in the memory when the tablet is operating in tablet mode, i.e., when the tablet is detached from the computer.

The platform controller hub may include logic (hardware and/or software) for a platform sync agent within or coupled to the hub. The platform sync agent may provide logic to enable faster switching between the computer and tablet modes.

The tablet also includes a basic input/output system (BIOS) 250 and PCIe device driver 260. The BIOS for the tablet may program or otherwise configure address mapping registers in the address decoder 220 for mapping the PCIe device and/or root port configuration address block to corresponding memory address blocks of 4 KB each, as described above.

The PCIe device driver controls the flow of information between the computer and tablet and/or other devices. When the tablet is disconnected from the computer (e.g., when in tablet mode and the PCI configuration space of the computer is virtualized), the device driver may block all input/output information at this time.

The tablet also includes a tablet transition manager 240 for managing transition of the tablet to and from the tablet mode when the tablet is respectively disconnected from and connected to the computer. In accordance with one embodiment, the tablet transition manager programs a machine state register (MSR) for initiating or otherwise controlling configuration space virtualization for the computer and/or its PCIe devices. The tablet transition manager may be implemented in firmware or a combination of firmware and hardware.

The connector 265 may be formed by male and female connector parts coupled to respective ones of the tablet and computer. In other embodiments, the connector may correspond to a different kind of interface (e.g., USB or other interface) or even a wireless link. As shown in FIG. 2, the connector may include signal lines, or pins, for transferring information over various communication protocols including USB, DMI, PCIe, high definition audio (HDA) protocols.

The computer has a platform controller hub (PCH) 270, a graphics processor 280, a computer transition manager 290, and a fan 295. The PCH manages the transfer of information and commands through the connector and thereby serves to expand the I/O functionality of the computer platform. The PCH also runs firmware stored in the computer transition manager 290. This firmware manages the transition of the computer based on whether or not the tablet is attached.

Figure 4:
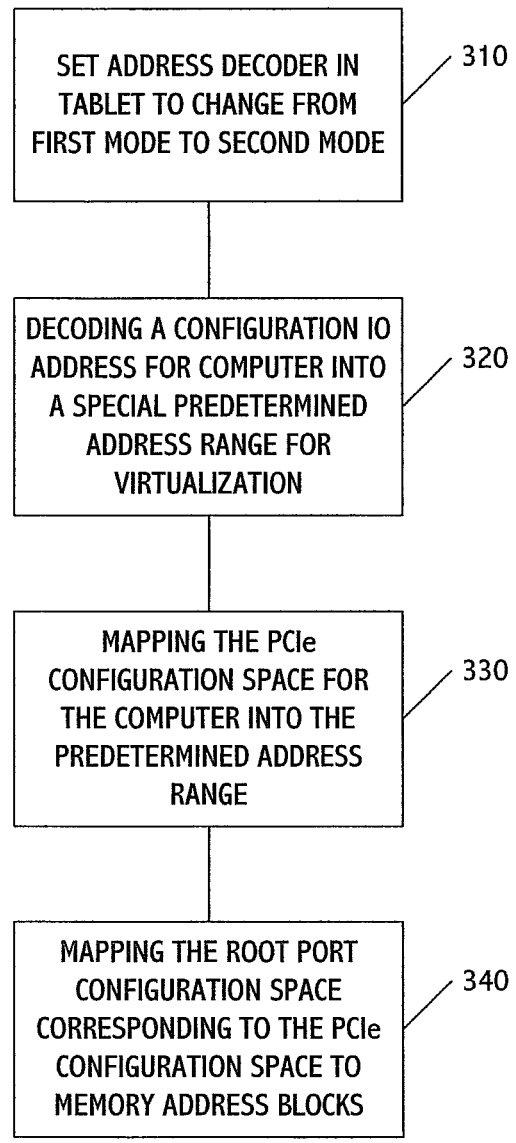
FIG. 4 is a diagram showing one embodiment of a method for controlling communications between a tablet and a computer.

FIG. 4 shows operations included in one embodiment of a method for controlling communication between a tablet and a computer. The method may be performed based on the system shown in FIGS. 2 and 3 or another system.

In an initial operation, the address decoder 220 is set to change from a first mode to a second mode. (Block 310). The first mode is one where PCIe configuration transactions are decoded into addresses when the tablet is operating in computer mode. When the tablet is to be disconnected, the address decoder is set to operate in a second (or special) mode for generating and storing information corresponding to a virtual PCIe configuration space for the computer.

The address decoder may be set to operate in the second mode by programming one or more control registers in the address decoder 220. This may be accomplished based on a command signal from BIOS 250 in the tablet. Programming of the address decoder register(s) may occur, for example, when a user request signal is generated to request disconnect of the tablet from the computer, when a detection circuit detects that the tablet has been disconnected, or based on another type of signal or set of conditions. In accordance with one embodiment, the address decoder may be set in the first or second mode based on the logical value of a single-bit control register.

Once the address decoder has been set to second mode, the address decoder decodes a configuration IO transaction address for each PCIe device (computer and/or its peripherals) into a special predetermined address for virtualization. (Block 320).

Figure 5:
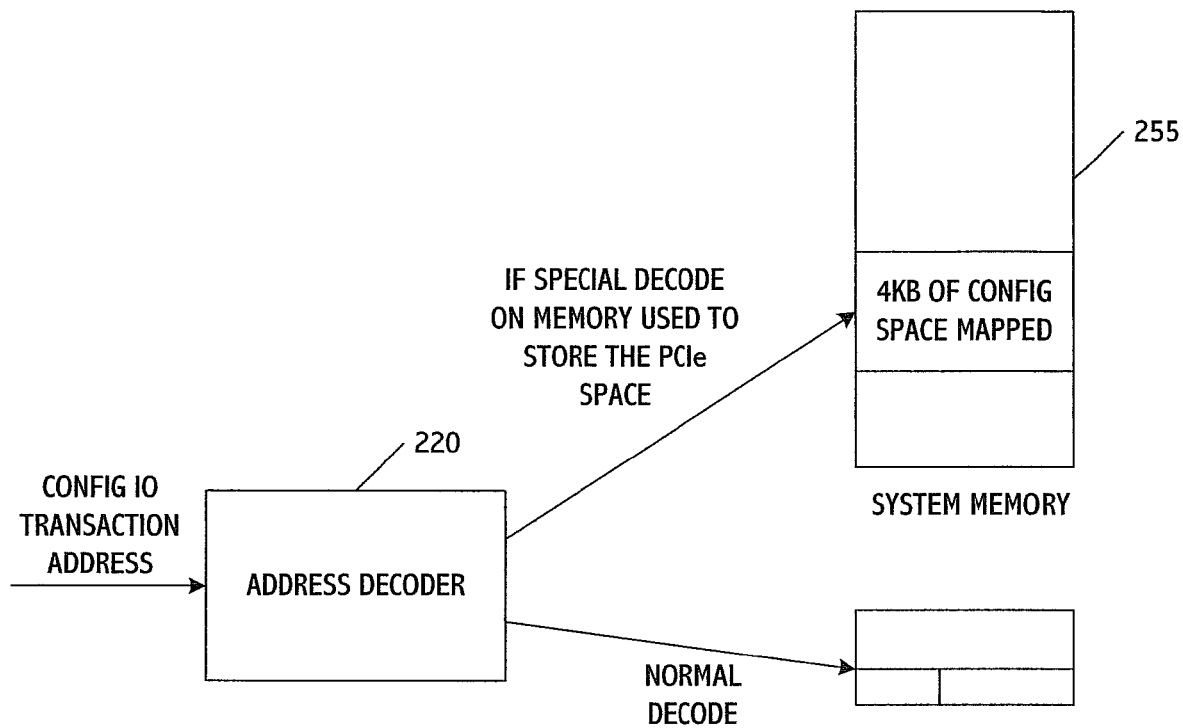
FIG. 5 is a diagram showing an example of a configuration space virtualization performed based on a memory mapping operation.

FIG. 5 shows an example of a configuration space virtualization performed based on a memory mapping operation using the address decoder operating in the second mode. As shown, the address decoder receives a configuration IO transaction address corresponding to each PCIe device (computer and/or its peripherals).

When operating in the first mode, the address decoder would decode this address (e.g., perform a memory mapping) in accordance with a normal decoding scheme, i.e., a scheme corresponding to computer mode. However, when the device is to switch to tablet mode, the address decoder decodes configuration IO transaction addresses into corresponding special predetermined ranges of memory addresses in memory 255.

More specifically, when operating in the second mode, the address decoder maps configuration IO blocks corresponding to each PCIe device (computer and/or its peripherals) into a predetermined range of memory address blocks for storage in memory 255. (Block 330). The memory address block range may be 4 KB to be consistent with the PCIe standard. However, in other embodiments, for example, where a different PCI standard or a different protocol is used, the memory address block range may have a different size.

In addition to this mapping, the root port configuration space corresponding to the PCIe configuration space for the computer may be mapped to another set of decoded memory address blocks. (Block 340). This set of memory address blocks may also be, for example, 4 KB in size. In accordance with one embodiment, the BIOS may program the base address in the decoder for each PCIe device (computer and/or its peripherals) and root port whose configuration space is to be virtualized. (In accordance with one embodiment, the PCIe configuration space for the computer may be understood to collectively correspond the PCIe peripherals of the computer. In another embodiment, PCIe configuration spaces may correspond to respective ones of the computer and/or its PCIe peripheral devices).

The mapping operations allow for a virtual PCIe configuration space to be stored for the computer and/or its peripheral devices when the device is to switch from computer mode to tablet mode. This information mapping may be accessed by the tablet transition manager at a later time when the tablet is to switch from tablet mode back to computer mode. Because the PCIe device configuration space for the computer and/or one its peripherals has been virtualized as a result of the mapping, rescanning and PnP initialization procedures may not be performed because the PCIe configuration space for the computer is up to date and stored as a result of virtualization. Once virtualization has performed, the computer may be physically detached from the tablet and the tablet may operate in tablet mode.

Figure 6:
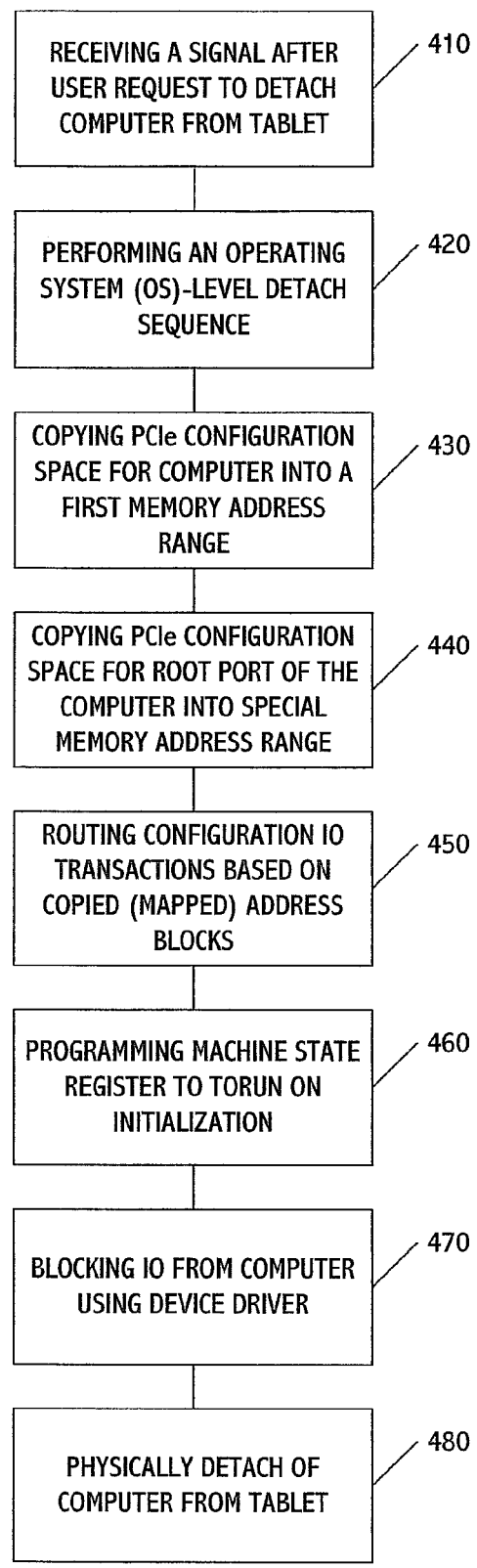
FIG. 6 shows another embodiment of a method for controlling communications between a tablet and computer when switching from computer mode to tablet mode.

FIG. 6 shows a more specific set of operations to be performed when the computer is to be detached from the tablet. This set of operations may be considered to be part of the previous embodiment or may corresponding to another embodiment for controlling communications between the computer and tablet.

An initial operation includes receiving a signal after a user request is made to detach the computer from the tablet. (Block 410). The signal may be generated by the operating system of the computer, in which case the signal may be transmitted to the controller of the tablet through the connector. Alternatively, the signal may be generated by the operating system of the tablet in response to the user request. The user may enter the request, for example, through a serial communications interface (SCI) or advanced configuration and power interface (ACPI) mechanism.

After the signal is received, the tablet controller may perform an operating system (OS)-level detach sequence (Block 420), after which the tablet transition manager is activated. The tablet transition manager copies (maps) the 4 KB PCIe configuration space block for the computer into a first pre-allocated address block in the memory of the tablet. (Block 430).

The tablet transition manager also copies (maps) the 4 KB configuration space for the root port corresponding to the computer into a second pre-allocated address block in the memory of the tablet. (Block 440). Blocks 430 and 440 may be performed for the computer and/or its peripheral PCIe devices.

After the copying operations are performed, the tablet transition manager programs the one or more register bits in the address decoder. These bits set the address decoder to the second (special) decoding mode previously discussed. The address decoder will then route the configuration IO transactions (e.g., read, write, etc.) for the computer to memory addresses based on the pre-allocated address blocks corresponding to mapped PCIe and root port configuration spaces for the computer. (Block 450). According to one embodiment, the computer itself may be considered to be a PCIe device relative to the tablet, as well as the peripherals of the computer.

In an additional operation, the tablet transition manager programs the machine state register with one or more predetermined bits to turn on the PCIe virtualization. (Block 460). When the virtualization bit is turned on, the device driver 260 of the tablet may block I/O from the operating system of the computer and/or from other devices. (Block 470). The computer may then be physically detached from the tablet. (Block 480).

Storing the PCIe and root port configuration spaces for the computer in the decoded memory address blocks in the tablet allows the computer to be virtualized in the device when operating in tablet mode. As a result, the tablet BIOS will interpret the computer as being attached when the computer has actually been detached.

More specifically, the BIOS/PCIe software stack may find the virtualized (fake) configuration IO block in memory and read off the first 256 bytes therefrom to conclude that the computer (with its PCIe devices) are still connected to the device. As a result, the virtual PCIe configuration space and root port configuration space for the computer (and/or its peripherals) will be recognized when the tablet switches back to computer mode, thereby alleviating the need to perform re-scanning and PnP initialization to determine the existence and identity of the PCIe devices connected to the computer.

Figure 7:
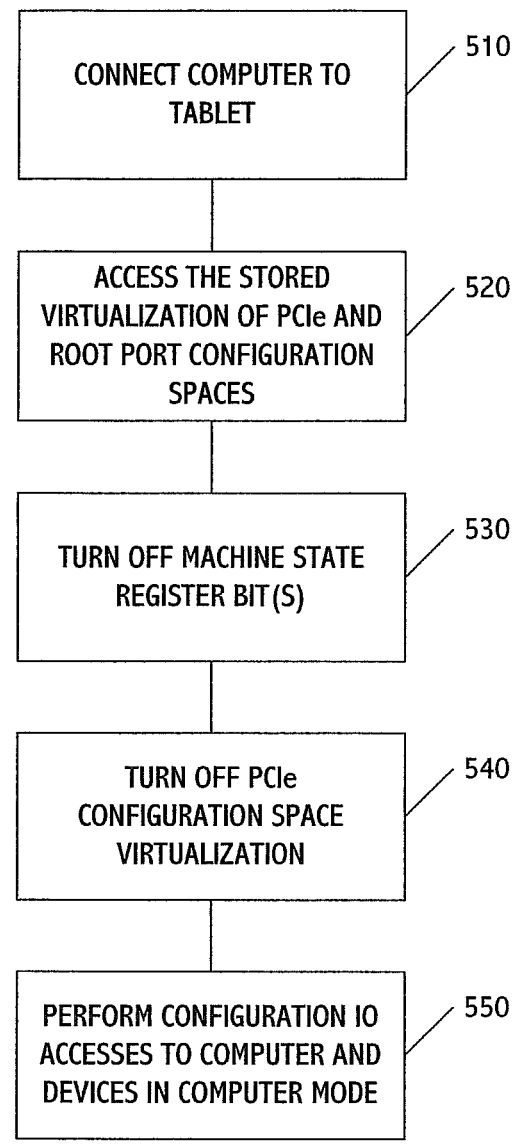
FIG. 7 shows an embodiment of a method for controlling communications between a tablet and computer when switching from tablet mode to computer mode.

FIG. 7 shows an embodiment of a method for controlling communications between a tablet and computer when switching from tablet mode to computer mode. In this embodiment, a user may physically connect the computer to the tablet. (Block 510). As previously indicated, the tablet may be attached in a variety of ways. For example, the tablet may attach to the computer through a USB cable or by mating male-and-female connectors. According to one embodiment, the tablet may correspond to the screen of a notebook computer, which is designed to be removably connected to the main body of the computer containing a keyboard.

According to another embodiment, the tablet may swivel or otherwise move between a first position that corresponds to a standard position of a notebook computer screen and a second position which overlaps and faces in an outward direction relative to the keyboard. In this embodiment, though the tablet always remains connected to the computer, the first position may be considered to be in an attached position and the second position may be considered to be detached.

After the computer is connected to the tablet, the tablet may be guided by the tablet transition manager to access the PCIe configuration space and root port configuration space information stored in memory for the computer. (Block 520). Access to this information (which virtualizes the computer) alleviates the need to perform a re-scanning procedure to determine the configuration space of the computer and its connected PCIe devices and also the need to perform PnP initialization.

By the time the tablet transition manager is invoked to complete the transition to the computer mode, the PCIe devices connected to the computer may be in stable condition. After or during this operation, the tablet transition manager turns off the MSR bit(s) (Block 530), which, in turn, turns off PCIe virtualization in the computer (Block 540) and turns off the address decoder (Block 550). All further configuration I/O accesses to the computer and its PCIe devices and their root ports will now be routed to locations as defined in computer mode. (Block 550).

As a result of this method, mapping of the configuration space I/O address 4 KB block(s) to memory virtualizes, or fakes, the existence of the computer and/or its PCIe devices for configuration space I/O. When the computer is reconnected to the tablet, the BIOS and/or PCIe software finds the fake configuration I/O block(s) and reads the first 256 bytes in each block to conclude that the computer is already present. This avoids the need to perform a configuration space re-scanning procedure and PnP initialization operations, which translates into a significant reduction in delay associated with operation of the tablet after connection.

Through these embodiments, the tablet may be allowed to use and interact with the PCIe device peripherals of the computer including the graphics processor of the computer. In the case where the tablet itself has a graphics processor, the tablet may switch between the use of its own graphics processor and the graphics processor of the computer to enhance capability, e.g., to expand the so-called computing platform of the connected system. This capability may be referred to as graphics switching.

In one or more of the aforementioned embodiments, the address block for the virtualized configuration space in formation may be determined by the decoding performed by the address decoder operating in the second mode. The decoding performed by the address decoder for the configuration spaces of the computer and root port may be determined based on programming of the decoder under control of the BIOS, based, for example, on pre-stored firmware.

In accordance with another embodiment, a non-transitory computer-readable medium stores information for controlling communication of information. The medium may be a read-only memory, a random access memory, a flash memory or another type of memory or storage device.

The information stored on the medium may include first code to store virtual configuration space information for a peripheral device of a computer in a memory of an electronic device when a first mode is to change to a second mode, and second code to access the virtual configuration space information from the memory of the electronic device when the second mode is to change to the first mode. The electronic device is connected to the computer in the first mode, and the electronic device is disconnected from the computer in the second mode.

Additionally, the virtual configuration space information may be accessed from the memory when the second mode is to be switched to the first mode to control recognition of the peripheral device of the computer by the electronic device without performing a re-scanning operation. Also, the virtual configuration space information may include information of a root port corresponding to the peripheral device of the computer.

Additionally, in accordance with one or more embodiments, the PCIe may correspond to a standard compatible with PCIe 3.0 released November 2010 or a later standard.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Also, the features of any one embodiment described herein may be combined with the features of one or more other embodiments to form additional embodiments.

Furthermore, for ease of understanding, certain functional blocks may have been delineated as separate blocks; however, these separately delineated blocks should not necessarily be construed as being in the order in which they are discussed or otherwise presented herein. For example, some blocks may be able to be performed in an alternative ordering, simultaneously, etc.

Although the present invention has been described herein with reference to a number of illustrative embodiments, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

We claim:

1. An electronic device comprising:
a controller to store in a memory virtual configuration space information for a peripheral device of a computer;
a transition manager to control the controller to operate in a first mode and a second mode, wherein the controller is to store the virtual configuration space information in the memory when the first mode is to be switched to the second mode, and wherein the controller is to access the virtual configuration space information when the second mode is to be switched to the first mode to control recognition of the peripheral device of the computer without performing a re-scanning operation; and
an address decoder to control a range of memory addresses to correspond to the virtual configuration space information of the peripheral device of the computer, wherein the address decoder is to decode a configuration I/O transaction address in the first mode differently from decoding of the configuration I/O transaction address in the second mode.

2. The electronic device of claim 1, wherein:
the electronic device is to be connected to the computer in the first mode, and
the electronic device is to be disconnected from the computer in the second mode.

3. The electronic device of claim 1, wherein the controller is to store in the memory virtual configuration information of a root port corresponding to the peripheral device of the computer.

4. The electronic device of claim 1, wherein the virtual configuration space information is Peripheral Component Interconnect express (PCIe) configuration space information and the peripheral device is a PCIe device of the computer.

5. The electronic device of claim 1, further comprising:
a device driver to control information flow between the electronic device and the computer in the first mode.

6. The electronic device of claim 1, further comprising:
a basic input/output system to set information in the controller to control operation in the first mode or the second mode.

7. The electronic device of claim 1, wherein the transition manager is to set at least one control bit to control the controller to store the virtual configuration space information in the memory.

8. The electronic device of claim 1, wherein the peripheral device of the computer is to be a graphics processor and wherein the controller is to receive information from the graphics processor based on the virtual configuration space information.

9. The electronic device of claim 1, wherein the electronic device is a tablet or a smart phone.

10. A method for controlling communication of information, comprising:
storing virtual configuration space information for a peripheral device of a computer in a memory of an electronic device when a first mode is to change to a second mode; and
accessing the virtual configuration space information from the memory of the electronic device when the second mode is to change to the first mode to control recognition of the peripheral device of the computer by the electronic device without performing a re-scanning operation;
decoding a configuration I/O transaction address in the first mode differently from decoding a configuration I/O transaction address in the second mode, wherein:

the electronic device is to be connected to the computer in the first mode, and the electronic device is to be disconnected from the computer in the second mode.

11. The method of claim 10, wherein the virtual configuration space information includes information of a root port corresponding to the peripheral device of the computer.

12. The method of claim 10, wherein the virtual configuration space information is peripheral component interconnect express (PCIe) configuration space information and the peripheral device is a PCIe device of the computer.

13. The method of claim 10, further comprising:

controlling a range of memory addresses to correspond to the virtual configuration space information of the peripheral device of the computer, said controlling to be performed by an address decoder.

14. The method of claim 10, further comprising:

controlling information flow between the electronic device and the computer in the first mode, said controlling performed by a device driver.

15. The method of claim 10, further comprising:

setting information to control operation in the first mode or the second mode, said setting performed by a basic input/output system.

16. The method of claim 10, wherein the electronic device is a tablet or a smart phone.

17. A non-transitory computer-readable medium storing information for controlling communication of information, said information comprising:

first code to store virtual configuration space information for a peripheral device of a computer in a memory of an electronic device when a first mode is to change to a second mode, wherein the virtual configuration space information is peripheral component interconnect express (PCIe) configuration space information and the peripheral device is a PCIe device of the computer; and second code to access the virtual configuration space information from the memory of the electronic device when the second mode is to change to the first mode to control recognition of the peripheral device of the computer by the electronic device without performing a re-scanning operation, wherein:

the electronic device is to be connected to the computer in the first mode, and the electronic device is to be disconnected from the computer in the second mode.

18. The medium of claim 17, wherein the virtual configuration space information includes information of a root port corresponding to the peripheral device of the computer.

* * * * *